(12) United States Patent
Al-Arfaj et al.

(10) Patent No.: US 11,807,801 B2
(45) Date of Patent: Nov. 7, 2023

(54) DRILLING FLUIDS AND METHODS OF MAKING AND USING THEREOF

(71) Applicants: Saudi Arabian Oil Company, Dhahran (SA); King Fahd University of Petroleum and Minerals, Dhahran (SA)

(72) Inventors: Mohammed K. Al-Arfaj, Dammam (SA); Tawfik Abdo Saleh, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 150 days.

(21) Appl. No.: 17/198,814

(22) Filed: Mar. 11, 2021

(65) Prior Publication Data

US 2022/0290030 A1    Sep. 15, 2022

(51) Int. Cl.
*C09K 8/16* (2006.01)
*E21B 43/25* (2006.01)

(52) U.S. Cl.
CPC .............. *C09K 8/16* (2013.01); *E21B 43/25* (2013.01); *C09K 2208/12* (2013.01)

(58) Field of Classification Search
CPC ........ C09K 2208/12; C09K 8/16; C09K 8/18; C09K 2208/00; C09K 8/00; C09K 8/02; C09K 8/03; C09K 8/04; E21B 43/00
See application file for complete search history.

(56) References Cited

U.S. PATENT DOCUMENTS

| 4,485,020 A | 11/1984 | Shay et al. |
| 8,822,386 B2 | 9/2014 | Quintero et al. |
| 10,611,942 B2 | 4/2020 | Boul et al. |

FOREIGN PATENT DOCUMENTS

| CA | 2768162 A1 | 8/2012 |
| CN | 103626937 A | 3/2014 |
| CN | 105693960 B | 7/2018 |

OTHER PUBLICATIONS

International Search Report and Written Opinion dated Dec. 10, 2021 pertaining to International application No. PCT/US2021/031049 filed May 6, 2021, 16 pages.
Aftab, A et al. "Nanoparticles based drilling muds a solution to drill elevated temperature wells: A review", Renewable and Sustainable Energy Reviews, Elseviers Science, New York, NY, US, Apr. 6, 2017, pp. 1301-1313.

*Primary Examiner* — Frances Tischler
(74) *Attorney, Agent, or Firm* — DINSMORE & SHOHL LLP

(57) ABSTRACT

The present disclosure relates drilling fluids and methods of producing and using drilling fluids. The drilling fluid includes an aqueous base fluid; a clay-based component; and a shale inhibitor comprising silica grafted with glutamate-glycol. The method of producing the drilling fluid includes reacting silica with glutamate and glycol thereby forming a shale inhibitor comprising silica grafted with glutamate-glycol; and mixing an aqueous base fluid, a clay-based component, and the shale inhibitor to produce a drilling fluid. The method of using the drilling fluid in drilling operations includes mixing an aqueous base fluid, a clay-based component, and a shale inhibitor comprising silica grafted with glutamate-glycol to produce a drilling fluid; and introducing the drilling fluid to a subsurface formation.

17 Claims, 6 Drawing Sheets

DRILLING FLUIDS AND METHODS OF MAKING AND USING THEREOF

TECHNICAL FIELD

The disclosure generally relates to drilling fluid, its manufacture and its use.

BACKGROUND

Drilling fluids in the oil and gas industries perform a myriad of tasks, including cleaning a well, holding cuttings in suspension, reducing friction, lubricating the drilling tools, maintaining stability of a wellbore, and preventing fluid loss, to name a few. Shale inhibitors may be included in a drilling fluid to avoid shale swelling when an aqueous drilling fluid contacts shale.

SUMMARY

Maintaining the borehole stability is critical in the drilling industry. As the oil and gas exploration and development continues to focus on unconventional resources such as deep-seated oil and gas resources, coal-seam gas reservoirs, and shale gas reservoirs under complex geological conditions, the well wall stability problem is often encountered in the exploration and drilling process, resulting in lower drilling speed in complex deep wells and horizontal shale gas wells, increased accidents, longer drilling cycle, and higher cost. That problem has severely affected the exploration and development process where geological conditions are extremely complex, and complex accidents, such as well wall collapse, well leakage, diameter shrinkage, jamming of drilling tools, logging blocking, and low cementing quality, etc., may occur easily at locations where the formation is high and steep, the strata are fractured, or the well traverses clay shale sections at a great deviation angle or horizontally. Consequently, not only the drilling cycle may be delayed, but also severe economic loss may occur.

90% borehole wall instability accidents in the well drilling process happen in the clay shale formation, where the dispersion and flaking-off of clay shale resulted from hydrated swelling of clay in the clay shale is the root cause for borehole wall instability. In the past few decades, oil-based drilling fluids always were an ideal choice for solving the problem of clay shale instability in well walls, owing to the fact that oil would not cause clay swelling. However, as environmental laws become increasingly strict, the application of oil-based drilling fluids is restricted owing to the severe damages of oil-based drilling fluids to the environment.

The shale inhibition capability of a water-based drilling fluid usually depends on the performance of the shale inhibitor in it. Conventional shale inhibitors include potassium chloride (KCl), silicates, polyamines and salts. However, conventional shale inhibitors do not provide long-term shale inhibition as characterized by anti-swelling ratio and shale recovery. Shale inhibitor performance may be measured by the shale cutting recovery rate of the drilling fluid, but the anti-swelling capacity of the drilling fluid, or both. Drilling fluids including conventional shale inhibitors, such as potassium chloride (KCl), have a shale cutting recovery rate of approximately 62% and an anti-swelling capacity of approximately 54%.

Accordingly, an ongoing need exists for a shale inhibitor for use in aqueous drilling fluids with a shale cutting recovery rate greater than at least 65% and an anti-swelling capacity greater than at least 55%. The present embodiments address these needs by a shale inhibitor including silica grafted with glutamate-glycol.

In one embodiment, the present disclosure relates to a method of producing a drilling fluid. The method includes reacting silica with glutamate and glycol thereby forming a shale inhibitor comprising silica grafted with glutamate-glycol; and mixing an aqueous base fluid, a clay-based component, and the shale inhibitor to produce the drilling fluid.

In another embodiment, the present disclosure relates to a drilling fluid including an aqueous base fluid; a clay-based component; and a shale inhibitor comprising silica grafted with glutamate-glycol.

In yet another embodiment, the present disclosure relates to a method of using the drilling fluid in drilling operations including mixing an aqueous base fluid, a clay-based component, and a shale inhibitor comprising silica grafted with glutamate-glycol to produce a drilling fluid; and introducing the drilling fluid to a subsurface formation.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWINGS

The following detailed description of specific embodiments of the present disclosure may be best understood when read in conjunction with the following drawings, where like structures are indicated with like reference numerals and in which.

DETAILED DESCRIPTION

Figure 1:
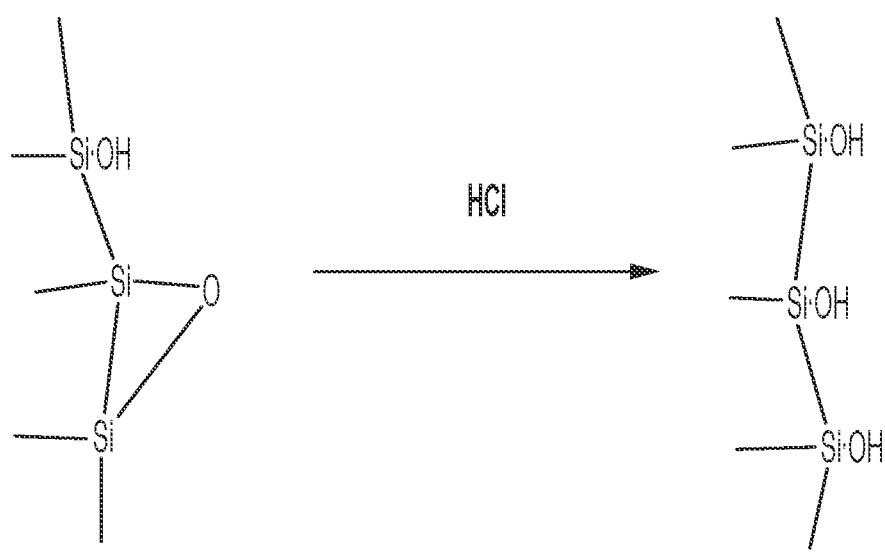
FIG. 1 schematically depicts the chemical activation of silica, according to one or more embodiments described in this disclosure.

As used throughout the disclosure, "aqueous" refers to a fluid containing, producing, resembling, or having the properties of water.

As used throughout this disclosure, the term "drilling fluid" refers to liquid and gaseous fluids and mixtures of fluids and solids (as solid suspensions, mixtures and emulsions of liquids, gases and solids) used in operations to drill wellbores.

As used throughout this disclosure, the term "lithostatic pressure" refers to the pressure of the weight of overburden, or overlying rock, on a subsurface formation.

As used throughout this disclosure, the term "Newtonian viscosity" refers to the apparent viscosity of a fluid measured at a given rotor speed of a rotational viscometer. The Newtonian viscosity may be measured by multiplying the dial reading of the viscometer by 300, and dividing that product by the rotor speed in revolutions per minute (RPM).

As used throughout this disclosure, the term "producing subsurface formation" refers to the subsurface formation from which hydrocarbons are produced.

As used throughout this disclosure, the term "reservoir" refers to a subsurface formation having sufficient porosity and permeability to store and transmit fluids.

As used throughout this disclosure, the term "subsurface formation" refers to a body of rock that is sufficiently distinctive and continuous from the surrounding rock bodies that the body of rock may be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "weighting agent" refers to an additive used to increase density of a drilling fluid.

As used throughout this disclosure, the term "wellbore" refers to the drilled hole or borehole, including the open-hole or uncased portion of the well. Borehole may refer to the inside diameter of the wellbore wall, the rock face that bounds the drilled hole.

Embodiments of the present disclosure are directed to drilling fluids including a shale inhibitor, and methods of producing and using the drilling fluids.

The drilling fluids of the present disclosure may be used in the oil and gas drilling industries, such as for drilling in oil and gas wells. Oil and gas wells may be formed in subsurface portions of the Earth, sometimes referred to as subsurface geological formations. The wellbore may serve to connect natural resources, such as petrochemical products, to a ground level surface. Drilling fluid may be utilized during the drilling process. To remove the rock cuttings from the bottom of the wellbore, drilling fluid is pumped down through the drill string to the drill bit. The drilling fluid may cool the drill bit and lift the rock cuttings away from the drill bit and may carry the rock cuttings upwards as the drilling fluid is recirculated back to the surface. The drilling fluid serves several functions in the drilling process. The drilling fluid may provide lubrication and may cool the drill bit. The drilling fluid may also transport rock cuttings from the drill bit to the surface. This may be referred to as cleaning the wellbore. Additionally, the drilling fluid may provide hydrostatic pressure in the wellbore. This provides support to the sidewalls of the wellbore and prevents the sidewalls from collapsing and caving in on the drill string. The drilling fluid may also prevent fluids in the downhole formations from flowing into the wellbore during drilling operations.

To accomplish these functions, the drilling fluid may be formulated to have specific characteristics. These characteristics may include increased Newtonian viscosity, yield point, plastic viscosity, density, solids content, pump-ability and hole-cleaning capability of the drilling fluid with the dispersed carbon nanotubes versus a similar or equivalent drilling fluid without the carbon nanotube dispersion. In particular, the drilling fluid may be formulated to have a density in a range suitable to provide the necessary hydrostatic pressure to support the sidewalls of the wellbore and prevent fluids in the formation from flowing into the wellbore. Additionally, the drilling fluids may be formulated to have specific rheological properties that allow the drilling fluid to be pumped down through the drill string while still capturing and conveying rock cuttings from the drill bit to the top of the wellbore. In some embodiments, the drilling fluids may include solid particles suspended in a base fluid. The solid particles, sometimes referred to as a weighting agent, may increase the density of the drilling fluid to help the drilling fluid support the sidewalls of the wellbore as well as increase the hydrostatic pressure to keep fluids from the formation from flowing into the wellbore. In other embodiments, the drilling fluids may be able to provide the necessary hydrostatic pressure without the use of solid particles to increase the density of the fluid.

As stated previously, the drilling fluid includes an aqueous base fluid. The aqueous base fluid may include at least one of fresh water, salt water, brine, municipal water, formation water, produced water, well water, filtered water, distilled water, sea water, or combinations of these. The brine may include at least one of natural and synthetic brine, such as saturated brine or formate brine. The aqueous base fluid may use water containing organic compounds or salt. Without being bound by any particular theory, salt or other organic compounds may be incorporated into the aqueous base fluid to control the density of the drilling fluid. Increasing the saturation of the aqueous base fluid by increasing the salt concentration or the level of other organic compounds in the aqueous base fluid may increase the density of the drilling fluid. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous base fluid. Without being bound by any particular theory, brine may be used to create osmotic balance between the drilling fluid and the subsurface formation.

In some embodiments, the drilling fluid may contain from 10 weight percent (wt. %) to 70 wt. % of the aqueous base fluid based on the total weight of the drilling fluid. In some embodiments, the drilling fluid may contain from 28 pounds per barrel (lb/bbl) to 630 lbs/bbl, such as from 30 to 600 lbs/bbl, from 50 to 500 lbs/bbl, from 100 to 500 lb/bbl, 200 to 500 lbs/bbl, or 300 to 600 lbs/bbl of the aqueous base fluid.

The clay-based component of the drilling fluid may be any clay-based material or mud suitable for use in drilling fluids, which may vary based on the application of use. In some embodiments, the clay-based component may contain, for instance, lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin, ($Al_2Si_2O_5(OH)_4$ or kaolinite), alumina ($Al_2O_3$, or aluminum oxide), silicon carbide, tungsten carbide, and combinations thereof. In some embodiments, the clay-based component may be bentonite. Without being bound by any particular theory, use of a clay-based component may increase the viscosity and rheology of the drilling fluid to allow for better drill lubrication, shear strength, and transportation of cuttings.

The drilling fluid may contain from 0.01 wt. % to 80 wt. % of the clay-based component based on the total weight of the drilling fluid. The drilling fluid may contain from 28 to 720 lb/bbl of the clay-based component based on the total weight of the drilling fluid. In some embodiments, the drilling fluid may contain from 28 to 700 lb/bbl, or 50 to 700 lb/bbl, or 100 to 700 lb/bbl, or 200 to 500 lb/bbl of the clay-based component.

The drilling fluid also includes a shale inhibitor. The shale inhibitor includes silica grafted with glutamate-glycol. In embodiments, the glycol may include triethylene glycol, tetraethylene glycol, pentaethylene glycol, propylene glycol, diethylene glycol, or combinations thereof. In embodiments, the glycol may include tetraethylene glycol. The drilling fluid may include from 0.5 to 10 wt. % shale inhibitor by weight of the drilling fluid. In embodiments, the drilling fluid may include from 0.5 to 10 wt. %, from 0.5 to 7 wt. %, from 0.5 to 5 wt. %, from 0.5 to 4 wt. %, from 0.5 to 3 wt. %, from 0.5 to 2.5 wt. %, from 0.5 to 2 wt. %, from 0.5 to 1.5 wt. %, from 0.5 to 1 wt. %, from 1 to 10 wt. %, from 1 to 7 wt. %, from 1 to 5 wt. %, from 1 to 4 wt. %, from 1 to 3 wt. %, from 1 to 2.5 wt. %, from 1 to 2 wt. %, from 1 to 1.5 wt. %, from 1.5 to 10 wt. %, from 1.5 to 7 wt. %, from 1.5 to 5 wt. %, from 1.5 to 4 wt. %, from 1.5 to 3 wt. %, from 1.5 to 2.5 wt. %, from 1.5 to 2 wt. %, from 2 to 10 wt. %, from 2 to 7 wt. %, from 2 to 5 wt. %, from 2 to 4 wt. %, from 2 to 3 wt. %, from 2 to 2.5 wt. %, from 2 to 1.5 wt. %, from 2.5 to 10 wt. %, from 2.5 to 7 wt. %, from 2.5 to 5 wt. %, from 2.5 to 4 wt. %, from 2.5 to 3 wt. %, from 3 to 10 wt. %, from 3 to 7 wt. %, from 3 to 5 wt. %, from 3 to 4 wt. %, from 4 to 10 wt. %, from 4 to 7 wt. %, from 4 to 5 wt. %, from 5 to 10 wt. %, from 5 to 7 wt. %, from 7 to 10 wt. %, or approximately 2 wt. % shale inhibitor by weight of the drilling fluid.

In some embodiments, the drilling fluid may include one or more additives. The one or more additives may include weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof. In some embodiments, the drilling fluid may contain from 0.01 wt. % to 20 wt. % of the one or more additives based on the total weight of the drilling fluid. The drilling fluid may contain from 0.02 lb/bbl to 180 lb/bbl of the one or more additives based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the one or more additives.

The drilling fluid may further include a weighting agent. The weighting agent may include barite, hematite, lime, calcium carbonate, bentonite, montmorillonite clay, siderite, ilmenite, hausmannite, ferrosilicon, manganese oxide, mullite, kaolinite, aluminum oxide, silicon carbide, tungsten carbide, or combinations thereof.

In some embodiments, the drilling fluid may contain from 0.01 wt. % to 20 wt. % of the at least one weighting agent based on the total weight of the drilling fluid. The drilling fluid may contain from 0.02 pounds per barrel (lb/bbl) to 180 lb/bbl of the one or more additives based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the one or more additives.

The drilling fluid may include a surfactant. The surfactant may maintain the dispersion of the carbon nanotubes within the drilling fluid. The surfactant may be anionic, cationic, or neutral. Non-limiting examples of anionic surfactants include sulfonated polymers, sulfonated alkanes, polycarboxylated ethers, or combinations of these. Non-limiting examples of cationic surfactants include trimethylalkylammonium salts, alkylbenxylammonium salts, or combinations of these. Non-limiting examples of neutral surfactants include proteins, polyethylene glycol derivatives, oligosaccharides, cholesterol derivatives, or combinations of these. The surfactant may include at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives. The drilling fluid may contain from 0.01 wt. % to 20 wt. % of the surfactant based on the total weight of the drilling fluid. The drilling fluid may contain from 0.02 lb/bbl to 180 lb/bbl of the surfactant based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the surfactant.

In some embodiments, the drilling fluid may include a viscosifier, also referred to as a rheology modifier, which may be added to the drilling fluid to impart non-Newtonian fluid rheology to the drilling fluid to facilitate lifting and conveying rock cuttings to the surface of the wellbore. The viscosifier may include bentonite, polyacrylamide, polyanionic cellulose, or combinations of these. In some embodiments, the drilling fluid may include xanthan gum, a polysaccharide commonly referred to XC polymer. The XC polymer may be added to the water-based drilling fluid to produce a flat velocity profile of the water-based drilling fluid in annular flow, which may help to improve the efficiency of the drilling fluid in lifting and conveying rock cuttings to the surface.

The drilling fluid may have a shale cutting recovery rate from 65% to 99%. Shale cutting recovery is measured by mixing crushed shale with the drilling fluid, hot rolling the mixture at 150° C. for 16 h, and then cooling the mixture to 25° C. After that, the mixture is filtered and washed with DI water and allowed to dry in a vacuum oven at 105° C. The dried shale remains are then sieved via 40-mesh sieve. The shale cutting recovery rate is calculated using Equation 1:

$$\text{Recovery} = \frac{M_1}{50} \times 100\% \qquad \text{Equation 1}$$

where $M_1$ is the weight of the sieve retained shale. In embodiments, the drilling fluid may have a shale cutting recovery rate from 65% to 99%, from 65% to 97%, from 65% to 95%, from 65% to 94%, from 70% to 99%, from 70% to 97%, from 70% to 95%, from 70% to 94%, from 75% to 99%, from 75% to 97%, from 75% to 95%, from 75% to 94%, from 80% to 99%, from 80% to 97%, from 80% to 95%, from 80% to 94%, from 85% to 99%, from 85% to 97%, from 85% to 95%, from 85% to 94%, from 90% to 99%, from 90% to 97%, from 90% to 95%, from 90% to 94%, from 91% to 99%, from 91% to 97%, from 91% to 95%, from 91% to 94%, from 92% to 99%, from 92% to 97%, from 92% to 95%, from 92% to 94%, or approximately 93%.

The drilling fluid may have an anti-swelling capacity in shale subsurface formations from 55% to 99%. Anti-swelling capacity is another way of expressing the anti-swelling ratio for measuring clay stabilization in drilling fluids. In accordance with China's Natural Gas Industry Standard SY/T 5971-94 for measuring clay stabilization in drilling fluids, about 1 g of sodium bentonite may be dispersed in 20.0 ml of the drilling fluid being studied and then left for 120 min. After that, the system may be centrifuged at approximately 1500 rpm until the fluid phase is separated from the clay particles. The anti-swelling ratio (AR, e.g. anti-swelling capacity) is calculated using Equation 2:

$$AR = \frac{V_W - V_P}{V_W - V_O} \quad \text{Equation 2}$$

where $V_P$ and $V_W$ are bentonite change in the volume in prepared material solution and the water. $V_O$ is the bentonite volume in kerosene.

In embodiments, the drilling fluid may have an anti-swelling capacity in shale subsurface formations from 55% to 99%, from 55% to 95%, from 55% to 93%, from 55% to 91%, from 60% to 99%, from 60% to 95%, from 60% to 93%, from 60% to 91%, from 65% to 99%, from 65% to 95%, from 65% to 93%, from 65% to 91%, from 70% to 99%, from 70% to 95%, from 70% to 93%, from 70% to 91%, from 75% to 99%, from 75% to 95%, from 75% to 93%, from 75% to 91%, from 80% to 99%, from 80% to 95%, from 80% to 93%, from 80% to 91%, from 85% to 99%, from 85% to 95%, from 85% to 93%, from 85% to 91%, from 87% to 99%, from 87% to 95%, from 87% to 93%, from 87% to 91%, from 89% to 99%, from 89% to 95%, from 89% to 93%, from 89% to 91%, or approximately 90%.

Embodiments of the disclosure further relate to methods of producing drilling fluids. The resulting drilling fluid may be in accordance with any of the embodiments previously described. The method of producing the drilling fluid includes reacting silica with glutamate and glycol thereby forming the shale inhibitor. The method further includes mixing the aqueous base fluid, the clay-based component, and the shale inhibitor to produce the drilling fluid.

Reacting the silica with glutamate and glycol may include refluxing the silica with glutamate and glycol in alcohol. In embodiments, the alcohol may include methanol, ethanol, propanol, or combinations thereof. In embodiments, the alcohol may include methanol.

In embodiments, the method may further include activating the silica before reacting the silica with glutamate and glycol. Activating the silica may include treating the silica with hydrochloric acid, nitric acid, formic acid, bromic acid, or combinations thereof. In embodiments, activating the silica may include treating the silica with hydrochloric acid, as shown in FIG. 1. In embodiments, the hydrochloric acid may be in an aqueous solution, and the solution may be from 20 to 50 wt. %, from 20 to 45 wt. %, from 20 to 40 wt. %, from 25 to 50 wt. %, from 25 to 45 wt. %, from 25 to 40 wt. %, from 30 to 50 wt. %, from 30 to 45 wt. %, from 30 to 40 wt. %, from 35 to 50 wt. %, from 35 to 45 wt. %, from 35 to 40 wt. %, or approximately 37 wt. % HCl. Treating the silica with hydrochloric acid may include refluxing the silica with hydrochloric acid for from 8 to 15 hours, from 8 to 13 hours, from 8 to 12 hours, from 8 to 11 hours, from 8 to 10 hours, from 10 to 15 hours, from 10 to 13 hours, from 10 to 12 hours, from 11 to 15 hours, from 11 to 13 hours, from 11 to 12 hours, or approximately 12 hours. It is contemplated that treating the silica with the hydrochloric acid may enrich the hydroxyl group. Activating the silica is shown in FIG. 1. In embodiments, the activated silica may then be filtered, washed with water, and dried under vacuum. Drying the activated silica under vacuum may include drying the silica under vacuum at from 40° C. to 100° C., from 40° C. to 80° C., from 40° C. to 70° C., from 40° C. to 65° C., from 50° C. to 100° C., from 50° C. to 80° C., from 50° C. to 70° C., from 50° C. to 65° C., from 55° C. to 100° C., from 55° C. to 80° C., from 55° C. to 70° C., from 55° C. to 65° C., or at approximately 60° C.

The method may further include centrifuging the shale inhibitor in an alcohol solution before mixing the aqueous base fluid, the clay-based component, and the shale inhibitor. The alcohol solution may include methanol, ethanol, propanol, or combinations thereof. The propanol may include 2-propanol. In embodiments, the alcohol solution may include 2-propanol, ethanol, or combinations thereof. In embodiments, the alcohol solution may include from 30 to 70 vol. %, from 30 to 60 vol. % from 30 to 55 vol. %, from 30 to 52 vol. %, from 40 to 70 vol. %, from 40 to 60 vol. % from 40 to 55 vol. %, from 40 to 52 vol. %, from 45 to 70 vol. %, from 45 to 60 vol. % from 45 to 55 vol. %, from 45 to 52 vol. %, from 48 to 70 vol. %, from 48 to 60 vol. % from 48 to 55 vol. %, from 48 to 52 vol. %, or approximately 50 vol. % 2-propanol by volume of the alcohol solution. In embodiments, the alcohol solution may include from 30 to 70 vol. %, from 30 to 60 vol. % from 30 to 55 vol. %, from 30 to 52 vol. %, from 40 to 70 vol. %, from 40 to 60 vol. % from 40 to 55 vol. %, from 40 to 52 vol. %, from 45 to 70 vol. %, from 45 to 60 vol. % from 45 to 55 vol. %, from 45 to 52 vol. %, from 48 to 70 vol. %, from 48 to 60 vol. % from 48 to 55 vol. %, from 48 to 52 vol. %, or approximately 50 vol. % ethanol by volume of the alcohol solution.

After centrifuging the shale inhibitor, the method may further include drying the shale inhibitor at from 50° C. to 100° C., from 50° C. to 90° C., from 50° C. to 85° C., from 50° C. to 82° C., from 60° C. to 100° C., from 60° C. to 90° C., from 60° C. to 85° C., from 60° C. to 82° C., from 70° C. to 100° C., from 70° C. to 90° C., from 70° C. to 85° C., from 70° C. to 82° C., from 75° C. to 100° C., from 75° C. to 90° C., from 75° C. to 85° C., from 75° C. to 82° C., from 78° C. to 100° C., from 78° C. to 90° C., from 78° C. to 85° C., from 78° C. to 82° C., or at approximately 80° C. before mixing the aqueous base fluid, the clay-based component, and the shale inhibitor.

The method may further include adding the additives previously described into the drilling fluid. Adding the additives may involve mixing the additives into the drilling fluid. In some embodiments, the drilling fluid may be mixed at a shear speed of from 4000 rotations per minute (RPM) to 16000 RPM. The drilling fluid may be mixed at a shear speed of from 4000 RPM to 15000 RPM, or from 5000 RPM to 15000 RPM, or from 5000 RPM to 1000 RPM, or from 8000 RPM to 16000 RPM, or from 10000 RPM to 16000 RPM, or from 12000 RPM to 16000 RPM.

Embodiments of the disclosure may also relate to methods for using the drilling fluid. The drilling fluid may be in accordance with any of the embodiments previously described. In some embodiments, the drilling fluid may be introduced into a subsurface formation. Introducing may involve injecting the drilling fluid into the subsurface formation, which, in some embodiments, may be a well. The drilling fluid may be circulated within the subsurface formation. In some embodiments, a mud pump may be used to inject the drilling fluid into the subsurface formation.

In some specific embodiments the disclosure relates to methods of using the drilling fluid for oil and gas drilling. The methods may include pumping the drilling fluid through a drill string to a drill bit and recirculating the drilling fluid. Recirculating the fluid may allow the drilling fluid to cool and lubricate the drill bit and to lift rock cuttings away from the drill bit, carrying the cuttings upwards to the surface to clean the wellbore. The drilling fluid may additionally provide hydrostatic pressure to support the sidewalls of the wellbore and prevent the sidewalls from collapsing onto the drill string.

As previously described, fluid rheology is an important parameter of drilling fluid performance. For critical offshore applications with extreme temperature and pressure requirements (such as temperatures greater than 200° C. and pressures greater than 1,000 pounds per square inch (psi)), the viscosity profile of the fluid often is measured with a controlled temperature and pressure rotational viscometer (for instance, an iX77 rheometer, commercially available from Fann Instruments (Houston, Tex.)). Fluids may be tested at temperatures of from 35° F. to 500° F., with pressures of up to 20,000 psi. Cold-fluid rheology may be important because of the temperatures less than 32° F. that the fluid is exposed to in deepwater risers. Temperatures greater than 100° F. may be encountered in deep wells or in geothermally heated wells. The fluid may be under pressures greater than 2,000 psi downhole, and its viscosity profile may change accordingly. The rheological behavior of the drilling fluid, such as gel strength, plastic viscosity, and yield point, may be determined from measurements of the Newtonian viscosity, shear stress, and shear rate.

The gel strength of a drilling fluid refers to the shear stress of the drilling fluid measured at a shear rate less than 10 RPM following a defined period of time during which the drilling fluid is maintained in a static state. The drilling fluids of the present disclosure may have a gel strength after 10 seconds of from 0.5 to 30 pounds force per 100 cubic feet ($lb_f/100\ ft^2$). In some embodiments, the drilling fluid may have a gel strength after 10 seconds of from 0.5 to 100 $lb_f/100\ ft^2$, from 0.5 to 60 $lb_f/100\ ft^2$, from 0.5 to 50 $lb_f/100\ ft^2$, from 0.5 to 40 $lb_f/100\ ft^2$, from 0.5 to 30 $lb_f/100\ ft^2$, from 0.5 to 20 $lb_f/100\ ft^2$, from 0.5 to 15 $lb_f/100\ ft^2$, from 0.5 to 10 $lb_f/100\ ft^2$, from 0.5 to 5 $lb_f/100\ ft^2$, from 0.5 to 1 $lb_f/100\ ft^2$, from 1 to 100 $lb_f/100\ ft^2$, from 1 to 60 $lb_f/100\ ft^2$, from 1 to 50 $lb_f/100\ ft^2$, from 1 to 40 $lb_f/100\ ft^2$, from 1 to 30 $lb_f/100\ ft^2$, from 1 to 20 $lb_f/100\ ft^2$, from 1 to 15 $lb_f/100\ ft^2$, from 1 to 10 $lb_f/100\ ft^2$, from 1 to 5 $lb_f/100\ ft^2$, from 5 to 100 $lb_f/100\ ft^2$, from 5 to 60 $lb_f/100\ ft^2$, from 5 to 50 $lb_f/100\ ft^2$, from 5 to 40 $lb_f/100\ ft^2$, from 5 to 30 $lb_f/100\ ft^2$, from 5 to 20 $lb_f/100\ ft^2$, from 5 to 15 $lb_f/100\ ft^2$, from 5 to 10 $lb_f/100\ ft^2$, from 10 to 100 $lb_f/100\ ft^2$, from 10 to 60 $lb_f/100\ ft^2$, from 10 to 50 $lb_f/100\ ft^2$, from 10 to 40 $lb_f/100\ ft^2$, from 10 to 30 $lb_f/100\ ft^2$, from 10 to 20 $lb_f/100\ ft^2$, from 10 to 15 $lb_f/100\ ft^2$, from 15 to 100 $lb_f/100\ ft^2$, from 15 to 60 $lb_f/100\ ft^2$, from 15 to 50 $lb_f/100\ ft^2$, from 15 to 40 $lb_f/100\ ft^2$, from 15 to 30 $lb_f/100\ ft^2$, from 15 to 20 $lb_f/100\ ft^2$, from 20 to 100 $lb_f/100\ ft^2$, from 20 to 60 $lb_f/100\ ft^2$, from 20 to 50 $lb_f/100\ ft^2$, from 20 to 40 $lb_f/100\ ft^2$, from 20 to 30 $lb_f/100\ ft^2$, from 30 to 100 $lb_f/100\ ft^2$, from 30 to 60 $lb_f/100\ ft^2$, from 30 to 50 $lb_f/100\ ft^2$, from 30 to 40 $lb_f/100\ ft^2$, from 40 to 100 $lb_f/100\ ft^2$, from 40 to 60 $lb_f/100\ ft^2$, from 40 to 50 $lb_f/100\ ft^2$, from 50 to 100 $lb_f/100\ ft^2$, from 50 to 60 $lb_f/100\ ft^2$, or from 60 to 100 $lb_f/100\ ft^2$.

Similarly, the drilling fluids of the present disclosure may have a gel strength after 10 minutes of from 0.5 to 50 $lb_f/100\ ft^2$. In some embodiments, the drilling fluid may have a gel strength after 10 seconds of from 0.5 to 100 $lb_f/100\ ft^2$, from 0.5 to 60 $lb_f/100\ ft^2$, from 0.5 to 50 $lb_f/100\ ft^2$, from 0.5 to 40 $lb_f/100\ ft^2$, from 0.5 to 30 $lb_f/100\ ft^2$, from 0.5 to 20 $lb_f/100\ ft^2$, from 0.5 to 15 $lb_f/100\ ft^2$, from 0.5 to 10 $lb_f/100\ ft^2$, from 0.5 to 5 $lb_f/100\ ft^2$, from 0.5 to 1 $lb_f/100\ ft^2$, from 1 to 100 $lb_f/100\ ft^2$, from 1 to 60 $lb_f/100\ ft^2$, from 1 to 50 $lb_f/100\ ft^2$, from 1 to 40 $lb_f/100\ ft^2$, from 1 to 30 $lb_f/100\ ft^2$, from 1 to 20 $lb_f/100\ ft^2$, from 1 to 15 $lb_f/100\ ft^2$, from 1 to 10 $lb_f/100\ ft^2$, from 1 to 5 $lb_f/100\ ft^2$, from 5 to 100 $lb_f/100\ ft^2$, from 5 to 60 $lb_f/100\ ft^2$, from 5 to 50 $lb_f/100\ ft^2$, from 5 to 40 $lb_f/100\ ft^2$, from 5 to 30 $lb_f/100\ ft^2$, from 5 to 20 $lb_f/100\ ft^2$, from 5 to 15 $lb_f/100\ ft^2$, from 5 to 10 $lb_f/100\ ft^2$, from 10 to 100 $lb_f/100\ ft^2$, from 10 to 60 $lb_f/100\ ft^2$, from 10 to 50 $lb_f/100\ ft^2$, from 10 to 40 $lb_f/100\ ft^2$, from 10 to 30 $lb_f/100\ ft^2$, from 10 to 20 $lb_f/100\ ft^2$, from 10 to 15 $lb_f/100\ ft^2$, from 15 to 100 $lb_f/100\ ft^2$, from 15 to 60 $lb_f/100\ ft^2$, from 15 to 50 $lb_f/100\ ft^2$, from 15 to 40 $lb_f/100\ ft^2$, from 15 to 30 $lb_f/100\ ft^2$, from 15 to 20 $lb_f/100\ ft^2$, from 20 to 100 $lb_f/100\ ft^2$, from 20 to 60 $lb_f/100\ ft^2$, from 20 to 50 $lb_f/100\ ft^2$, from 20 to 40 $lb_f/100\ ft^2$, from 20 to 30 $lb_f/100\ ft^2$, from 30 to 100 $lb_f/100\ ft^2$, from 30 to 60 $lb_f/100\ ft^2$, from 30 to 50 $lb_f/100\ ft^2$, from 30 to 40 $lb_f/100\ ft^2$, from 40 to 100 $lb_f/100\ ft^2$, from 40 to 60 $lb_f/100\ ft^2$, from 40 to 50 $lb_f/100\ ft^2$, from 50 to 100 $lb_f/100\ ft^2$, from 50 to 60 $lb_f/100\ ft^2$, or from 60 to 100 $lb_f/100\ ft^2$.

The rheological behavior of the drilling fluid may be determined by measuring the shear stress on the drilling fluid at different shear rates, which may be accomplished by measuring the shear stress or shear rate on the drilling fluid. The various shear rates are utilized as drilling fluid behaves as a rigid body at lesser shear stresses but flows as a viscous fluid at greater shear stresses. The rheology of the drilling fluid may be characterized by the plastic viscosity (PV) in centiPoise (cP) and the yield point (YP), which are parameters from the Bingham plastic rheology model. The PV is related to the resistance of the drilling fluid to flow due to mechanical interaction between the solids of the drilling fluid and represents the viscosity of the drilling fluid extrapolated to infinite shear rate. The PV reflects the type and concentration of the solids in the drilling fluid. The PV of a drilling fluid may be estimated by measuring the shear stress of the drilling fluid using the previously described rheometer at spindle speeds of 300 rotations per minute (RPM) and 600 RPM and subtracting the 300 RPM dial reading from the 600 RPM dial reading according to Equation 3:

$$\text{PV (cP)}=(\text{dial reading at 600 RPM})-(\text{dial reading at 300 RPM}) \quad \text{Equation 3}$$

The drilling fluids of the present disclosure may have a PV of from 5 to 2000 cP. In some embodiments, the drilling fluid may have a PV of from 5 to 5000 cP, from 5 to 1500 cP, from 5 to 1000 cP, from 5 to 500 cP, from 5 to 100 cP, from 5 to 50 cP, from 50 to 5000 cP, from 50 to 2000 cP, from 50 to 1500 cP, from 50 to 1000 cP, from 50 to 500 cP, from 50 to 100 cP, from 100 to 5000 cP, from 100 to 2000 cP, from 100 to 1500 cP, from 100 to 1000 cP, from 100 to 500 cP, from 500 to 5000 cP, from 500 to 2000 cP, from 500 to 1500 cP, from 500 to 1000 cP, from 1000 to 5000 cP, from 1000 to 2000 cP, from 1000 to 1500 cP, from 1500 to 5000 cP, from 1500 to 2000 cP, or from 2000 to 5000 cP.

The drilling fluid behaves as a rigid body when the shear stress is less than the YP, and the drilling fluid flows as a viscous fluid when the shear stress is greater than the YP. In other words, the YP represents the amount of stress required to move the drilling fluid from a static condition. The YP is expressed as a force per area, such as pounds of force per one hundred square feet ($lb_f/100\ ft^2$). YP provides an indication of the solids carrying capacity of the drilling fluid through the annulus, which in simplified terms gives an indication of the drilling fluid's hole-cleaning ability. A drilling fluid having a YP of equal to or greater than 15 $lb_f/100\ ft^2$ is considered acceptable for drilling. The YP is determined by extrapolating the Bingham plastic rheology model to a shear rate of zero. The YP may be estimated from the PV (as measured in accordance with Equation 1, as previously described) according to Equation 4:

$$YP = (\text{dial reading at 300 RPM}) - PV \quad \text{Equation 4}$$

The drilling fluids of the present disclosure may have a YP of from 0.5 to 50 lb$_f$/100 ft$^2$. In some embodiments, the drilling fluids of the present disclosure may have a YP of from 0.5 to 100 lb$_f$/100 ft$^2$, from 0.5 to 60 lb$_f$/100 ft$^2$, from 0.5 to 40 lb$_f$/100 ft$^2$, from 0.5 to 30 lb$_f$/100 ft$^2$, from 0.5 to 20 lb$_f$/100 ft$^2$, from 0.5 to 15 lb$_f$/100 ft$^2$, from 0.5 to 10 lb$_f$/100 ft$^2$, from 0.5 to 5 lb$_f$/100 ft$^2$, from 0.5 to 1 lb$_f$/100 ft$^2$, from 1 to 100 lb$_f$/100 ft$^2$, from 1 to 60 lb$_f$/100 ft$^2$, from 1 to 50 lb$_f$/100 ft$^2$, from 1 to 40 lb$_f$/100 ft$^2$, from 1 to 30 lb$_f$/100 ft$^2$, from 1 to 20 lb$_f$/100 ft$^2$, from 1 to 15 lb$_f$/100 ft$^2$, from 1 to 10 lb$_f$/100 ft$^2$, from 1 to 5 lb$_f$/100 ft$^2$, from 5 to 100 lb$_f$/100 ft$^2$, from 5 to 60 lb$_f$/100 ft$^2$, from 5 to 50 lb$_f$/100 ft$^2$, from 5 to 40 lb$_f$/100 ft$^2$, from 5 to 30 lb$_f$/100 ft$^2$, from 5 to 20 lb$_f$/100 ft$^2$, from 5 to 15 lb$_f$/100 ft$^2$, from 5 to 10 lb$_f$/100 ft$^2$, from 10 to 100 lb$_f$/100 ft$^2$, from 10 to 60 lb$_f$/100 ft$^2$, from 10 to 50 lb$_f$/100 ft$^2$, from 10 to 40 lb$_f$/100 ft$^2$, from 10 to 30 lb$_f$/100 ft$^2$, from 10 to 20 lb$_f$/100 ft$^2$, from 10 to 15 lb$_f$/100 ft$^2$, from 15 to 100 lb$_f$/100 ft$^2$, from 15 to 60 lb$_f$/100 ft$^2$, from 15 to 50 lb$_f$/100 ft$^2$, from 15 to 40 lb$_f$/100 ft$^2$, from 15 to 30 lb$_f$/100 ft$^2$, from 15 to 20 lb$_f$/100 ft$^2$, from 20 to 100 lb$_f$/100 ft$^2$, from 20 to 60 lb$_f$/100 ft$^2$, from 20 to 50 lb$_f$/100 ft$^2$, from 20 to 40 lb$_f$/100 ft$^2$, from 20 to 30 lb$_f$/100 ft$^2$, from 30 to 100 lb$_f$/100 ft$^2$, from 30 to 60 lb$_f$/100 ft$^2$, from 30 to 50 lb$_f$/100 ft$^2$, from 30 to 40 lb$_f$/100 ft$^2$, from 40 to 100 lb$_f$/100 ft$^2$, from 40 to 60 lb$_f$/100 ft$^2$, from 40 to 50 lb$_f$/100 ft$^2$, from 50 to 100 lb$_f$/100 ft$^2$, from 50 to 60 lb$_f$/100 ft$^2$, or from 60 to 100 lb$_f$/100 ft$^2$.

EXAMPLES

Example 1

The synthesis of the shale inhibitor including silica grafted with glutamate-tetraethylene glycol (SiGT) was accomplished as in the following steps. First, the silica was activated. Then, the activated silica was grafted with glutamate and tetraethylene glycol.

The silica was activated by treating 20 grams (g) of silica with 150 ml hydrochloric acid (37%) for 8 hours to enrich its hydroxyl group, as shown in FIG. 1. The activated silica was filtered, washed with deionized water, and dried under vacuum at 60° C. to be used.

Figure 2:
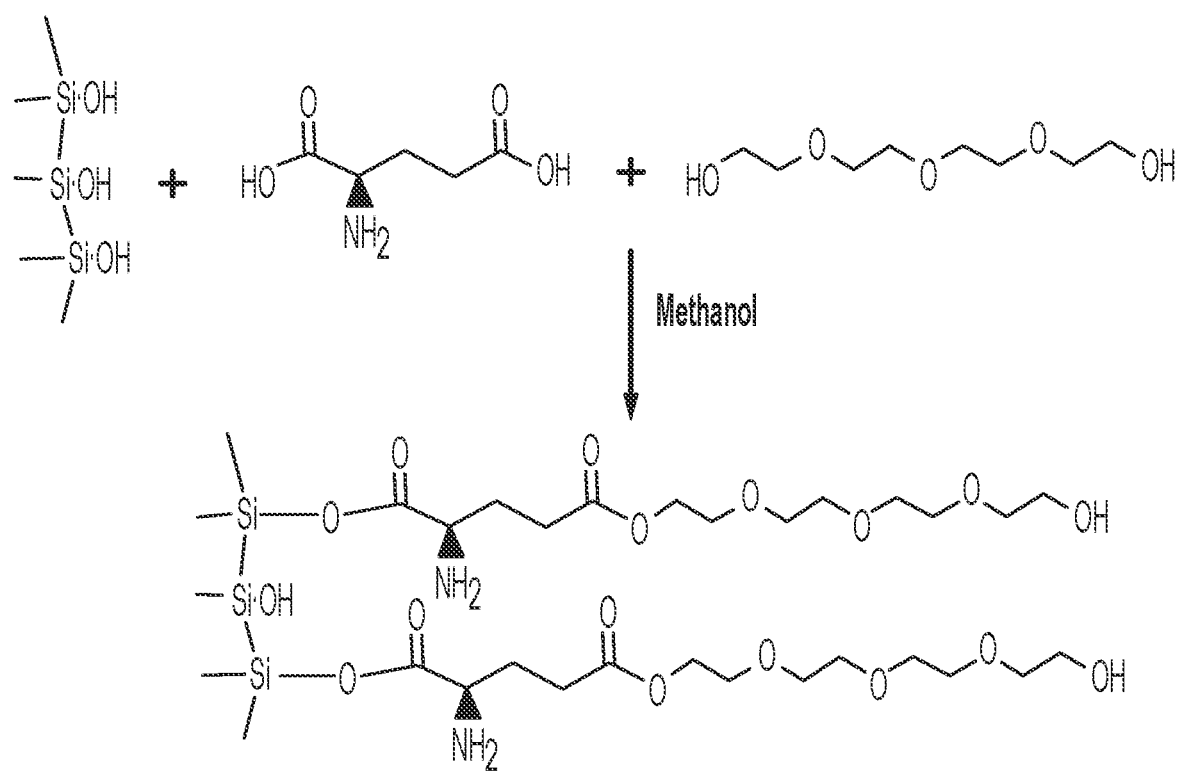
FIG. 2 schematically depicts the chemical modification of silica, according to one or more embodiments described in this disclosure.

The activated silica was then modified with glutamate and tetraethylene glycol, as shown in FIG. 2. 28.8 g of glutamic acid was weighed and transferred into separate 0.5 L round bottom flasks equipped with a condenser. Then, 10 g of silica-OH was added. The system was stirred for 6 hours. Then, 87.2 g of tetraethylene glycol was added into each flask. The reaction was then carried out in 0.2 L methanol by refluxing for 24 hours in oil bath. Upon completion of the reaction, the setup was left to cool down, dismantled and the materials were then centrifuged. The recovered modified silica was further dispersed in an alcohol solution including 60 mL 2-propanol and 60 mL ethanol with simultaneous centrifugation to remove the unconsumed starting materials. The obtained products were then dried overnight in oven at 80° C. to form the SiGT shale inhibitor.

Example 2

Figure 3:
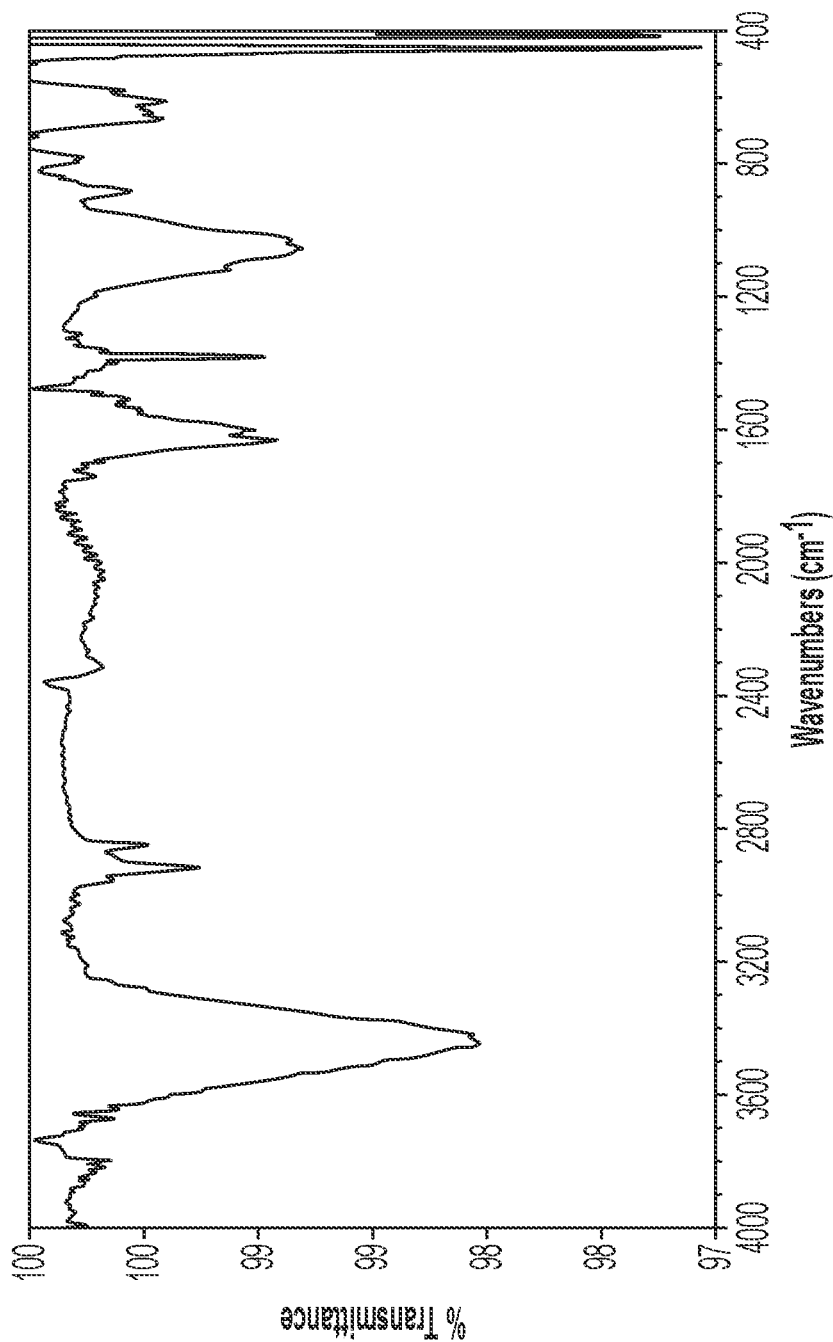
FIG. 3 graphically depicts the FTIR spectrum of silica grafted with glutamate-tetraethylene glycol, according to one or more embodiments described in this disclosure.

The Fourier transform infrared spectra (FTIR) of the shale inhibitor was acquired through Perkin-Elmer 630 FTIR spectrophotometer. 5 wt. % of the shale inhibitor was mixed and made into pellet (2.5 cm diameter). After the pellet was dried at 105° C. for 24 h, the IR spectra were obtained at room temperature by subjecting the pellet to the wavenumber range with a minimum scan of 32 scans under 4 cm$^{-1}$ resolution. The FTIR spectrum of the prepared inhibitor is shown in FIG. 3. The absorption peaks suggest the character of the bonds (Si—O, NH$_2$, OH, C=O, and C—O) present in the structure of the inhibitor. Peaks at around 3300-3500 cm$^{-1}$ are associated with N—H stretching. The broadband in this region is due to the O—H vibration stretching mode. The peak at 1650 cm$^{-1}$ is due to the C=O stretch. The peak at 1466 is a result of CH$_2$ bending of the chain while the one at 1100 cm$^{-1}$ may be ascribed to C—O stretching vibration. The peaks at 2850 and 2920 cm$^{-1}$ are characteristic of CH$_2$ stretching. The Si—O stretching appeared at 600-700 cm$^{-1}$.

Example 3

Figure 4:
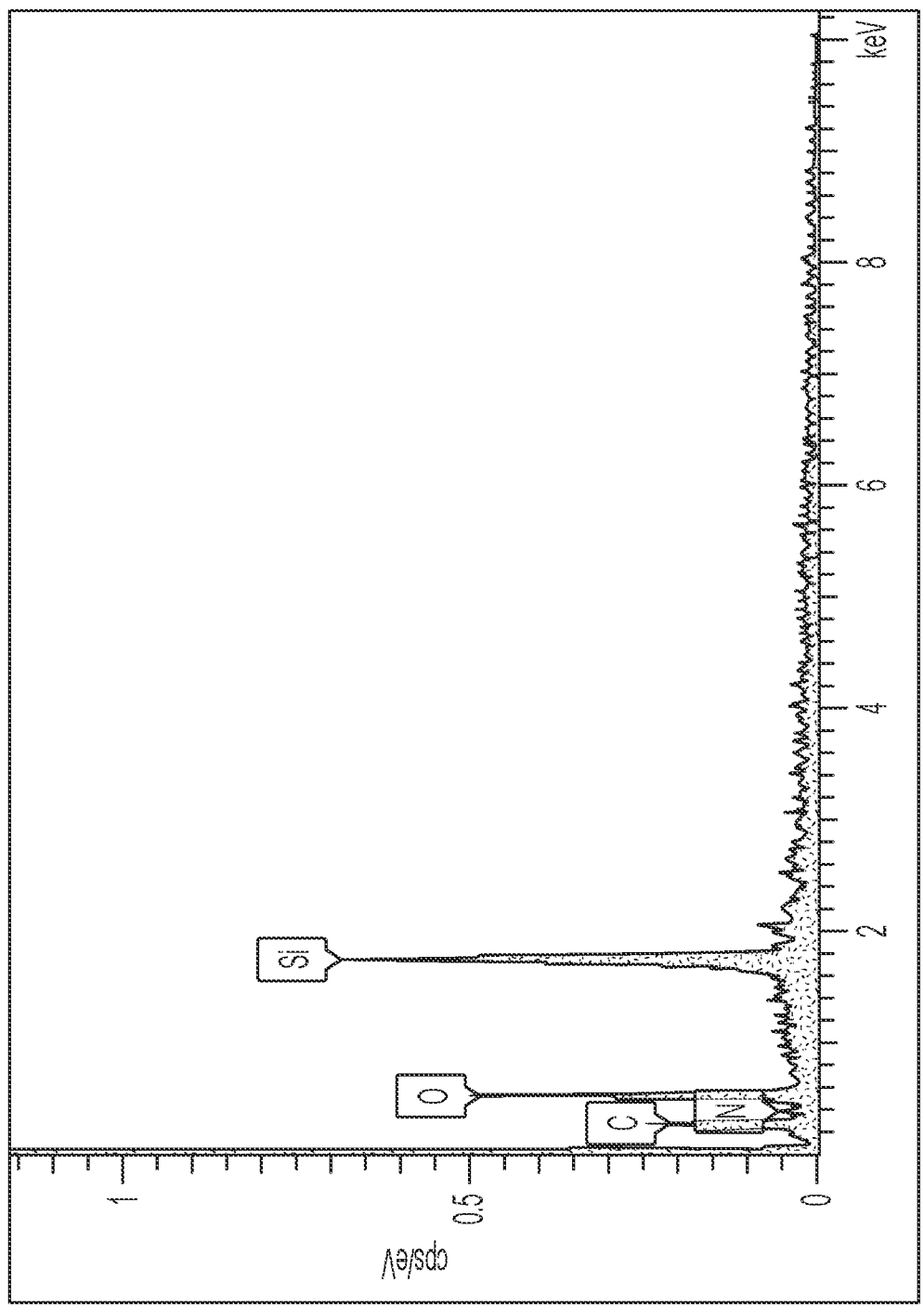
FIG. 4 graphically depicts the EDX spectrum of silica grafted with glutamate-tetraethylene glycol, according to one or more embodiments described in this disclosure.

The morphology of the material was observed using a Scanning electron microscope (SEM). While the thermogravimetric analysis (TGA) was achieved in a TGA analyzer (NETZSCH 209F3, available from Netzsch Group headquartered in Selb, Germany) with the heating range of 25° C. to 600° C. and a heating rate of 10° C. per minute under nitrogen atmosphere. The SEM images indicated the grafting of the branches on the silica. Silica could be advantageous to plug the apertures on the shale surface while the branches functionality inhibits the water interacting with the shale. The EDX of the shale inhibitor is shown in FIG. 4. The EDX of the shale inhibitor demonstrates the significant content of carbon, oxygen, silicon, and nitrogen with weight % of 31.9, 31.8, 31.5, and 4.8 respectively.

Example 4

Figure 5:
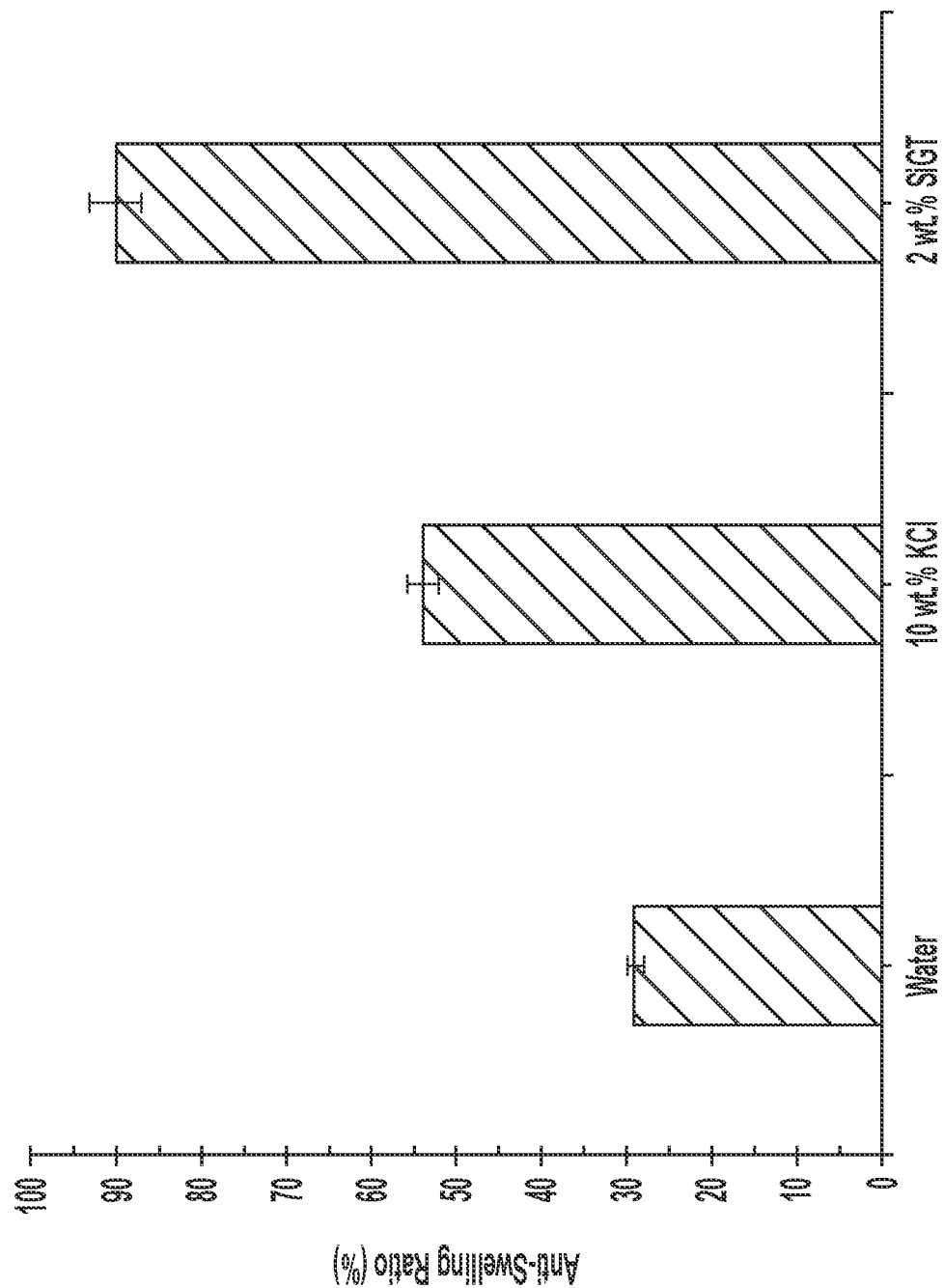
FIG. 5 graphically depicts anti-swelling ratio results, according to one or more embodiments described in this disclosure.

The anti-swelling ratio (AR) was carried out in accordance with China's Natural Gas Industry Standard SY/T 5971-94 for measuring clay stabilization in drilling fluids. Around 1 g of sodium bentonite (Na—Bt, having the formula Al$_2$H$_2$Na$_2$O$_{13}$Si$_4$) was dispersed in 20.0 ml of a composite solution (the composite solution included 2 wt. % of the shale inhibitor in water) and then left for 120 min. After that, the system was centrifuged at approximately 1500 RPM until the fluid phase is separated from the clay particles. The change in the volume of bentonite was recorded and the anti-swelling ratio (AR, the anti-swelling capacity) was calculated using Equation 2 as previously described and as reproduced subsequently:

$$AR = \frac{V_W - V_P}{V_W - V_O} \quad \text{Equation 2}$$

where $V_P$ and $V_W$ are bentonite change in the volume in prepared material solution and the water. $V_O$ is the bentonite volume in kerosene. The anti-swelling capacity of 2 wt. % of the SiGT shale inhibitor was inspected and its activity was compared to the use of 10 wt. % of potassium chloride (KCl) in water. Potassium chloride has been the conventional inhibitor commonly use in the drilling industry for oil and gas well. FIG. 5 shows the percentage of anti-swelling strength of an aqueous solution including 2 wt. % SiGT shale inhibitor and an aqueous solution including 10 wt. % KCl on sodium bentonite (Na—Bt). The response of Na—Bt in the solutions was compared to its behavior in water. The value recorded for pure water was approximately 30%.

Shales are known to suffer swelling due to their affinity for water in water-based drilling fluids based on the montmorillonite presence within the shale. The montmorillonite in the Na—Bt caused the Na—Bt to undergo rapid swelling and dispersion when it contacted the water. The 10 wt. % KCl solution gave a 54% anti-swelling ratio while the aqueous solution including 2 wt. % SiGT shale inhibitor gave approximately 90%. Therefore, the aqueous solution including 2 wt. % SiGT shale inhibitor displayed greater inhibiting characteristics as compared to both water alone and the aqueous solution including 10 wt. % KCl.

Example 5

Shale recovery was examined on shale in the solution of each inhibitor. The shale was crushed and sieved by 6-10 mesh sizes. About 50 g of the crushed shale was then mixed with 0.35 Liters (L) of the aqueous solution including 2 wt. % SiGT shale inhibitor in a 0.5 L vessel. The vessel was hot-rolled in the hot-roller oven at 150° C. for 16 hours. Then, the mixture was allowed to cool to 25° C. After that, it was filtered and washed with deionized water. Then, it was allowed to dry in a vacuum oven at 105° C. The dried shale remains were then sieved via 40-mesh sieve. The weight of the sieve retained shale was recorded as $M_1$. The same procedure was followed for a solution of only water and the aqueous solution including 10 wt. % KCl. The recovery was calculated using Equation 1 as previously described and as reproduced subsequently:

$$\text{Recovery} = \frac{M_1}{50} \times 100\% \qquad \text{Equation 1}$$

Figure 6:
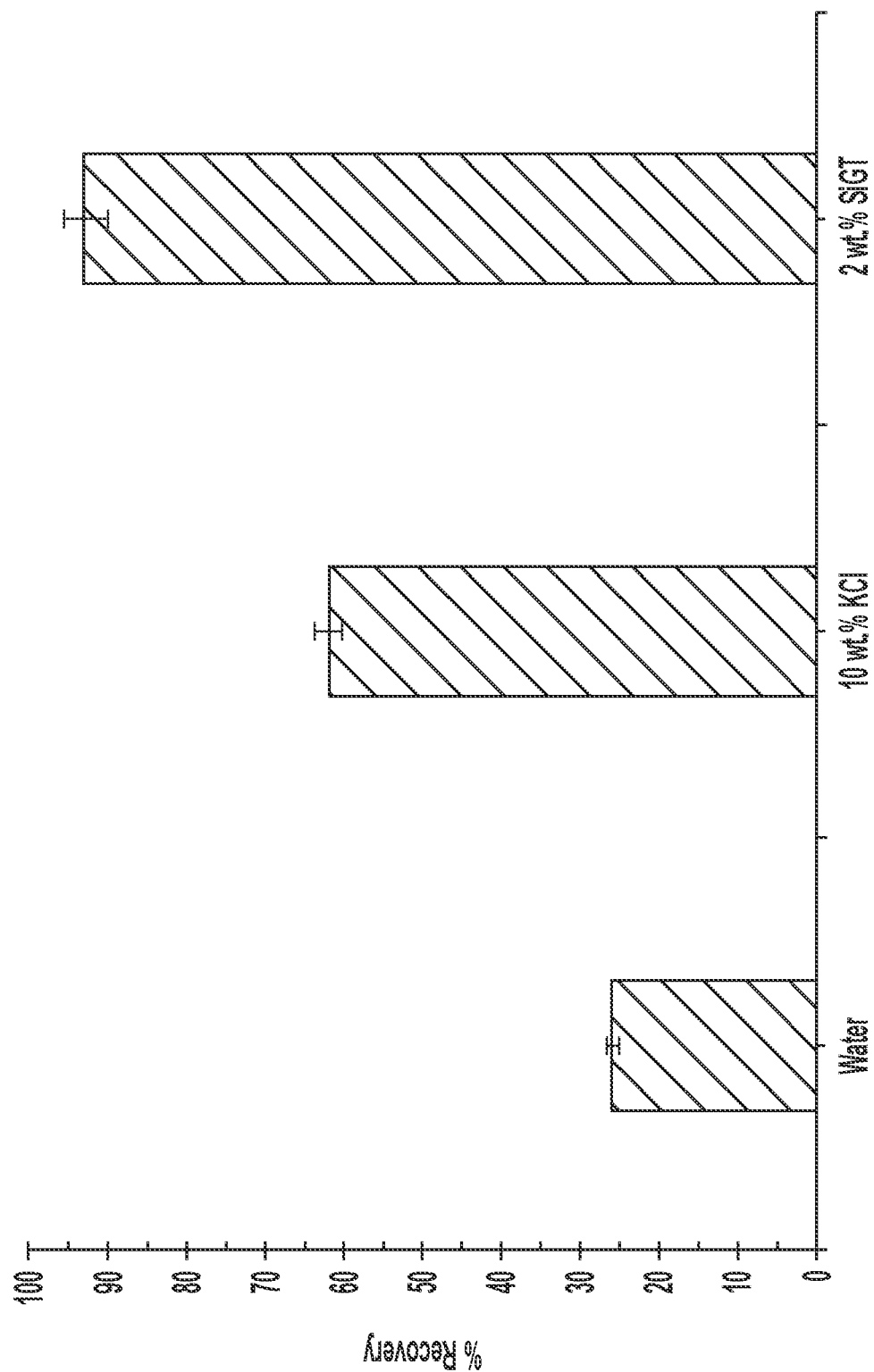
FIG. 6 graphically depicts shale recovery test results, according to one or more embodiments described in this disclosure.

Shale dispersion test is critical in assessing the proficiency of inhibitors to hinder shale swelling and dissipation when in contact with the water component of the water-based fluid. The results are shown in FIG. 6. Shale cuttings suffered significant fluffing in ordinary water compared to the aqueous solution including 10 wt. % KCl and the aqueous solution including 2 wt. % SiGT shale inhibitor. The highest recovery was recorded for the aqueous solution including 2 wt. % SiGT shale inhibitor, which had a recovery rate of approximately 93%. This was a great achievement compared to previous studies of some other materials graphene, polymeric and nonpolymeric shale inhibiting materials. The aqueous solution including 10 wt. % KCl exhibited an intermediate recovery value of approximately 62%. The notably high shale recovery of cuttings in the aqueous solution including 2 wt. % SiGT shale inhibitor indicates that the SiGT shale inhibitor not only minimizes water invasion into shale formation but also preserves the integrity of the shale and prevents the shale from dispersing in the fluid formulation.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents. Unless otherwise stated within the application, all tests, properties, and experiments are conducted at room temperature and atmospheric pressure.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of producing a drilling fluid, the method comprising:
    reacting silica with glutamate and glycol, thereby forming a shale inhibitor comprising silica grafted with glutamate-glycol; and
    mixing an aqueous base fluid, the shale inhibitor, and at least one of a clay material or a mud to produce the drilling fluid, and wherein
    the drilling fluid does not comprise KCl, has a shale cutting recovery rate from 65% to 99%, and has an anti-swelling capacity from 55% to 99%.

2. The method of claim 1, wherein reacting the silica with glutamate and glycol comprises refluxing the silica with glutamate and glycol in alcohol.

3. The method of claim 2, wherein the alcohol comprises methanol, ethanol, propanol, or combinations thereof.

4. The method of claim 1, further comprising activating the silica before reacting the silica with glutamate and glycol, wherein activating the silica comprises treating the silica with hydrochloric acid, nitric acid, formic acid, bromic acid, or combinations thereof.

5. The method of claim 1, further comprising centrifuging the shale inhibitor in an alcohol solution before mixing the aqueous base fluid, at least one of the clay material and the mud, and the shale inhibitor.

6. The method of claim 5, wherein the alcohol solution comprises methanol, ethanol, propanol, or combinations thereof.

7. The method of claim 5, further comprising drying the shale inhibitor from 50° C. to 90° C. after centrifuging the shale inhibitor and before mixing the aqueous base fluid, at least one of the clay material and the mud, and the shale inhibitor.

8. The method of claim 1, wherein:
    the aqueous base fluid comprises fresh water, salt water, brine, municipal water, formation water, produced water, well water, filtered water, distilled water, sea water, or combinations of these;
    the clay material based component comprises bentonite, montmorillonite clay, mullite ($3Al_2O_3 \cdot 2SiO_2$ or $2Al_2O_3 \cdot SiO_2$), kaolin ($Al_2Si_2O_5(OH)_4$ or kaolinite), or combinations thereof;
    the mud comprises lime (CaO), $CaCO_3$, barium sulfate (barite), hematite ($Fe_2O_3$), alumina ($Al_2O_3$, or aluminum oxide), silicon carbide, tungsten carbide, or combinations thereof;
    the glycol comprises tetraethylene glycol; and
    the drilling fluid comprises from 0.5 to 10 wt. % shale inhibitor by weight of the drilling fluid.

9. A drilling fluid produced according to the method of claim 1, the drilling fluid comprising:
    an aqueous base fluid;
    at least one of a clay material and a mud; and
    a shale inhibitor comprising silica grafted with glutamate-glycol, and wherein
    the drilling fluid does not comprise KCl, has a shale cutting recovery rate from 65% to 99%, and has an anti-swelling capacity from 55% to 99%.

10. The drilling fluid of claim 9, wherein:
    the aqueous base fluid comprises fresh water, salt water, brine, municipal water, formation water, produced water, well water, filtered water, distilled water, sea water, or combinations of these;
    the clay-based material comprises bentonite, montmorillonite clay, mullite ($3Al_2O_3 \cdot 2SiO_2$ or $2Al_2O_3 \cdot SiO_2$), kaolin ($Al_2Si_2O_5(OH)_4$ or kaolinite), or combinations thereof;
    the mud comprises lime (CaO), $CaCO_3$, barium sulfate (barite), hematite ($Fe_2O_3$), alumina ($Al_2O_3$, or aluminum oxide), silicon carbide, tungsten carbide, or combinations thereof;
    the glycol comprises tetraethylene glycol; and
    the drilling fluid comprises from 0.5 to 10 wt. % shale inhibitor by weight of the drilling fluid.

11. The drilling fluid of claim 9, wherein the drilling fluid further comprises weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof.

12. The drilling fluid of claim 9, wherein the drilling fluid further comprises a weighting agent comprising barite, hematite, lime, calcium carbonate, bentonite, montmorillonite clay, siderite, ilmenite, hausmannite, ferrosilicon, manganese oxide, mullite, kaolinite, aluminum oxide, silicon carbide, tungsten carbide, or combinations thereof.

13. The drilling fluid of claim 9, wherein the drilling fluid further comprises a surfactant comprising sulfonated polymers, sulfonated alkanes, polycarboxylated ethers, trimethylalkylammonium salts, alkylbenzylammonium salts, proteins, polyethylene glycol derivatives, oligosaccharides, cholesterol derivatives, or combinations thereof.

14. The drilling fluid of claim 9, wherein the drilling fluid further comprises a viscosifier comprising bentonite, polyacrylamide, polyanionic cellulose, or combinations thereof.

15. A method of using a drilling fluid in drilling operations, the method comprising:
    mixing an aqueous base fluid, a shale inhibitor comprising silica grafted with glutamate-glycol, and at least one of a clay material and a mud to produce a drilling fluid according to the method to claim 1; and
    introducing the drilling fluid to a subsurface formation and wherein
    the drilling fluid does not comprise KCl, has a shale cutting recovery rate from 65% to 99%, and has an anti-swelling capacity from 55% to 99%.

16. The method of claim 15, wherein introducing the drilling fluid comprises injecting the drilling fluid and at least partially circulating the drilling fluid within the subsurface formation.

17. The method of claim 15, wherein:
    the aqueous base fluid comprises fresh water, salt water, brine, municipal water, formation water, produced water, well water, filtered water, distilled water, sea water, or combinations of these; and
    the clay material comprises bentonite, montmorillonite clay, mullite ($3Al_2O_3 \cdot 2SiO_2$ or $2Al_2O_3 \cdot SiO_2$), kaolin ($Al_2Si_2O_5(OH)_4$ or kaolinite), or combinations thereof;
    the mud comprises lime (CaO), $CaCO_3$, barium sulfate (barite), hematite ($Fe_2O_3$), alumina ($Al_2O_3$, or aluminum oxide), silicon carbide, tungsten carbide, or combinations thereof;
    the glycol comprises tetraethylene glycol; and
    the drilling fluid comprises from 0.5 to 10 wt. % shale inhibitor by weight of the drilling fluid; and
    the drilling fluid further comprises weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, surfactants, or combinations thereof.

* * * * *